United States Patent Office.

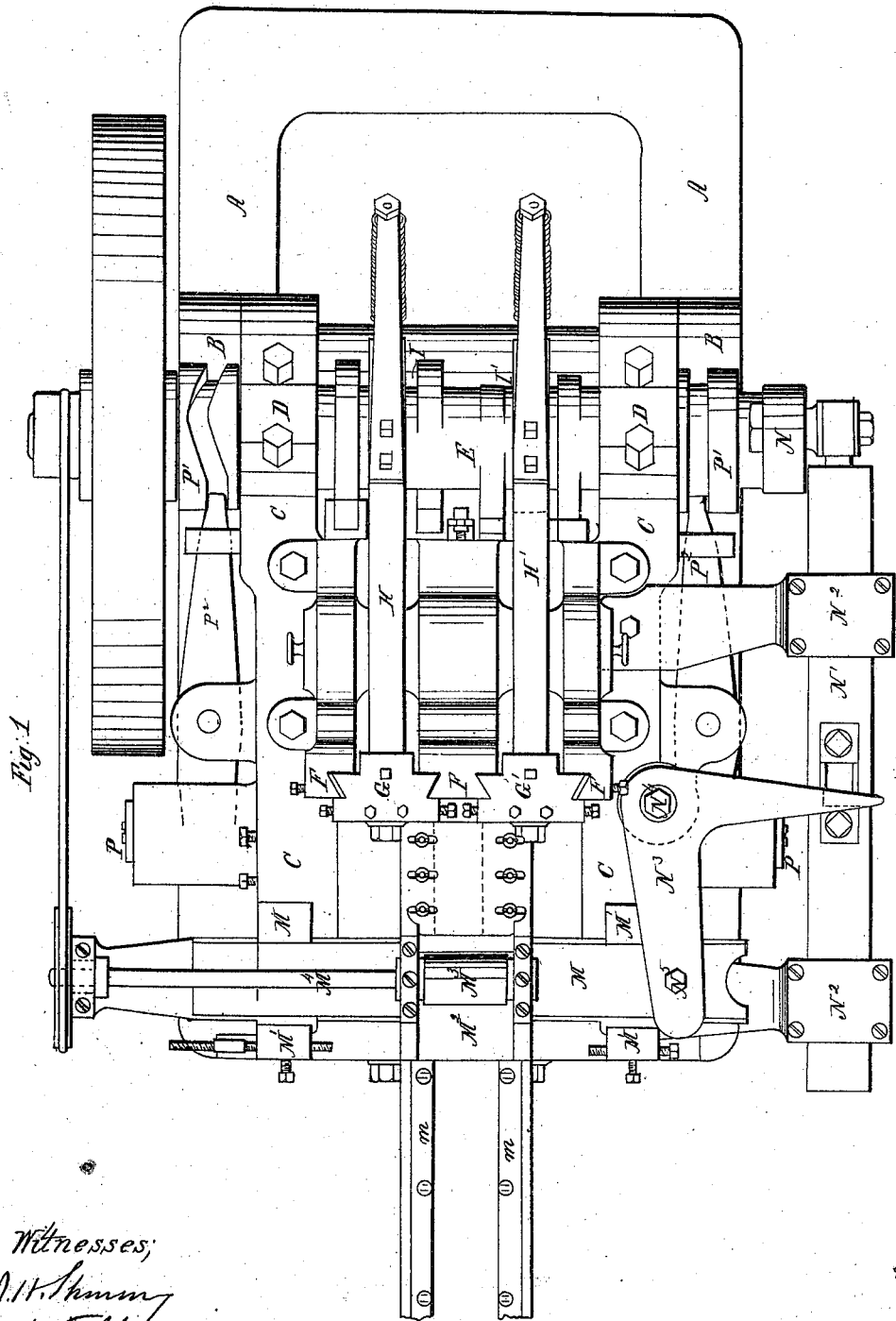

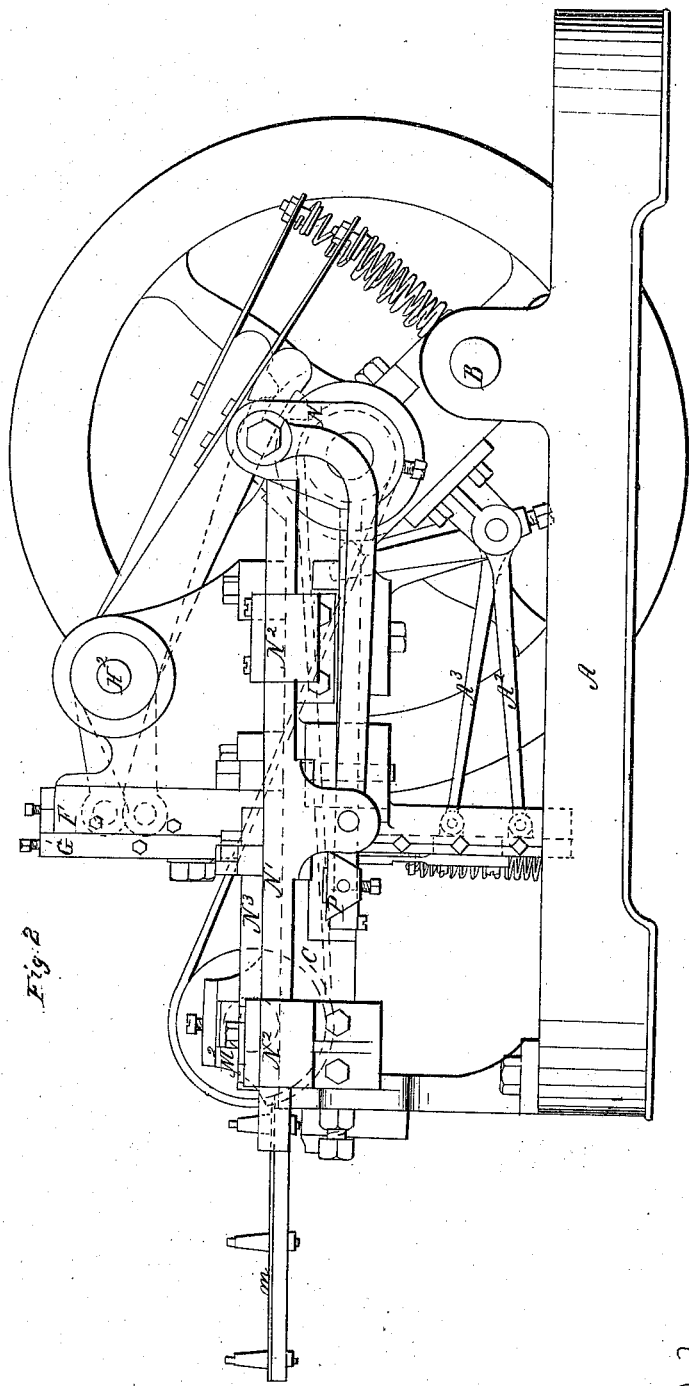

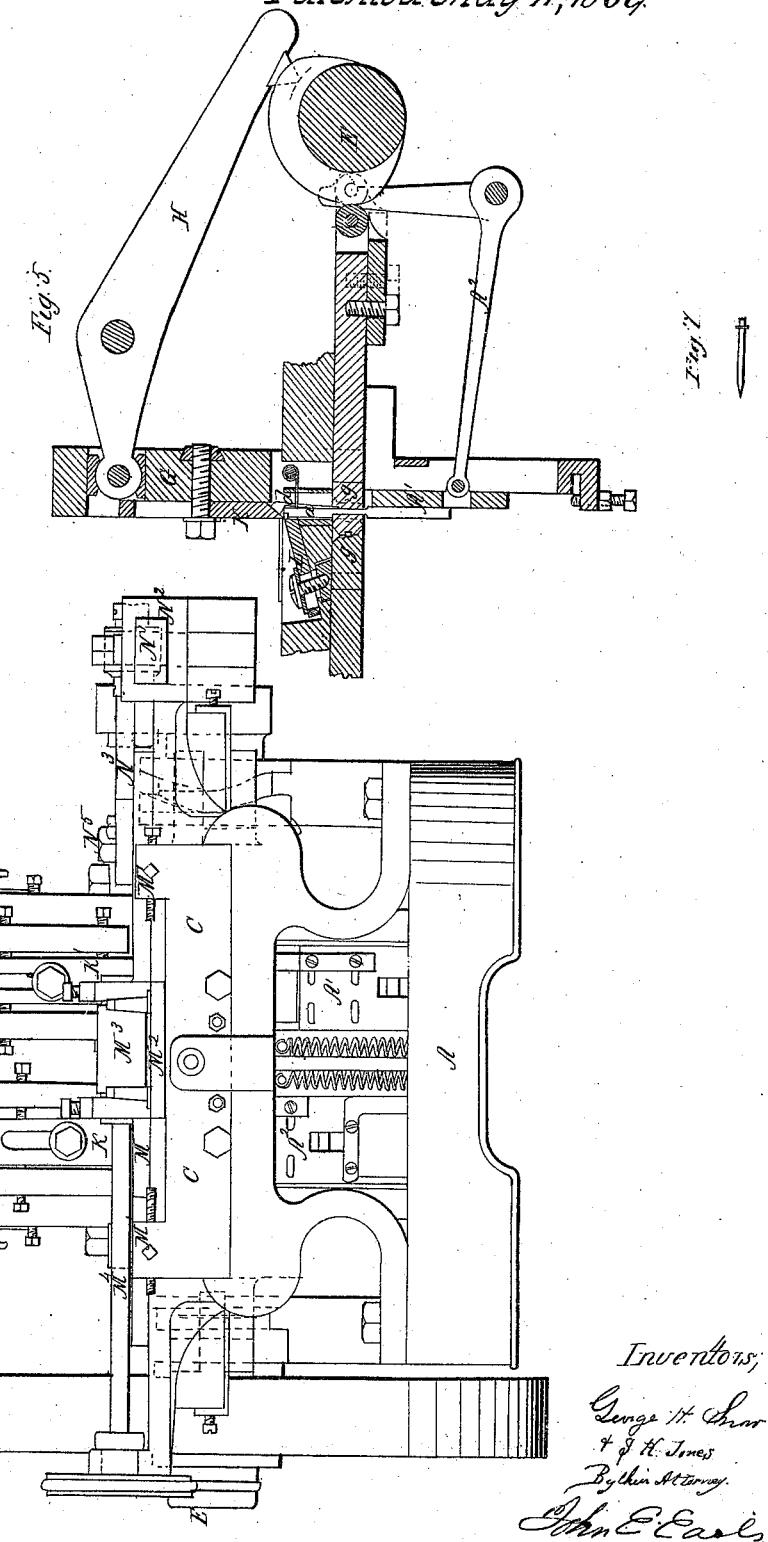

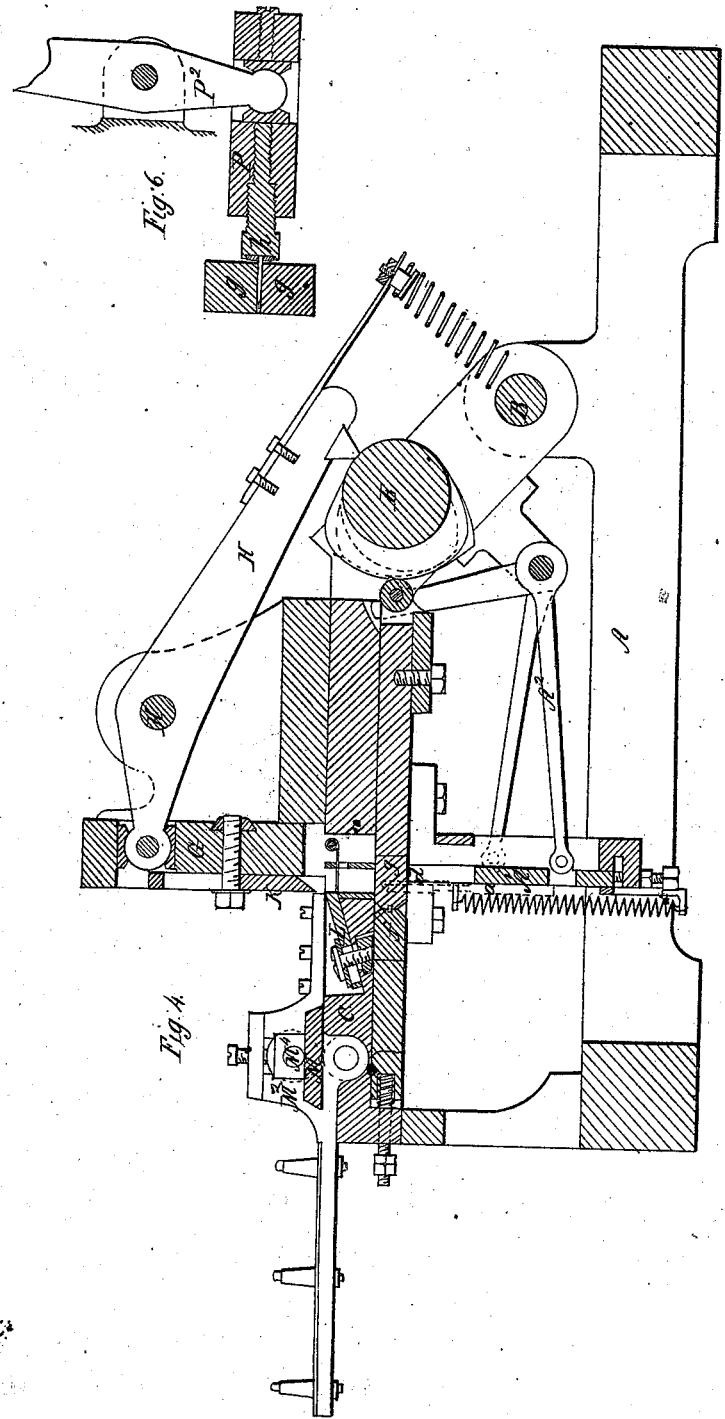

S. K. JONES AND GEORGE H. SNOW, OF NEW HAVEN, CONNECTICUT, ASSIGNORS TO S. K. JONES, A. A. WILCOX, LYSANDER FLAGG, AND JESSE CUDWORTH, JR.

Letters Patent No. 90,003, dated May 11, 1869.

IMPROVED MACHINE FOR MAKING CUT-NAILS.

The Schedule referred to in these Letters Patent and making part of the same.

*To all whom it may concern:*

Be it known that we, S. K. JONES and GEORGE H. SNOW, of New Haven, in the county of New Haven, and State of Connecticut, have invented a new Improvement in Nail-Machine; and we do hereby declare the following, when taken in connection with the accompanying drawings, and the letters of reference marked thereon, to be a full, clear, and exact description of the same, and which said drawings constitute part of this specification, and represent, in—

Figure 1, a top view.
Figure 2, a side view.
Figure 3, a front view.
Figure 4, a longitudinal section.
Figures 5 and 6, detached sectional views, to illustrate the construction and operation.

This invention relates to an improvement in machines for making nails from sheet-metal, the machine being designed with special reference to the manufacture of the nail for which Letters Patent were granted to A. A. Wilcox, August 14, 1866, but is alike applicable to making nails or tacks of any other description from sheet-metal; and The invention consists in the arrangement of a plate-feeder, in combination with two alternately-acting cutters, so that the said feeder will, by a reciprocating movement, present the plate to each of the two cutters, so that the first nail is cut by one of the cutters, the next by the second, and so on; also, in the device for heading the nail after it has been cut.

To enable others to construct and use our improvement, we will fully describe the same, as illustrated in the accompanying drawings.

A is the bed or frame upon which the machine is placed, the whole machine being hung on the said bed upon bearings B, so that the machine may be turned up, for the purpose of adjusting the parts underneath the bed-plate C.

On the said bed-plate, in proper bearings D, the driving-shaft E is arranged, so as to revolve freely therein, power being applied thereto in any convenient or known manner.

Upon the said bed, and in proper guides F, are arranged two vertical slides G and G', the said slides being moved up and down by means of cams I and I¹, upon the driving-shaft E, through levers H and H', the said levers being hung upon a fulcrum H².

In each of the said slides G and G' are fixed, respectively, cutters K and K'. (See figs. 3, 4, and 5.) The cams which operate the said slides are arranged so that the operation of the slides is alternate, that is, the one rising while the other descends, and *vice versa*.

On the bed-plate C, and in proper relative position to the cutters K and K', are arranged fixed cutters L, (see figs. 4 and 5,) so that the vertical cutters pass down across the edge of the fixed cutters L, and the combined action of the movable and fixed cutter cuts in like manner as in ordinary cutting-machines.

M is a slide arranged transversely across the machine in guides M¹, and operated to move the said guides by the action of a crank, N, on the driving-shaft, which is connected to a slide, N¹, moving in guides N², at right angles to the slide M, and the said slide N¹, acting upon a bell crank-lever N³, pivoted at N⁴, and in connection with a slide, N⁵, so that as the crank revolves the slide M is moved transversely across the bed-plate, and upon the said slide M is arranged the nail-plate feeder M², so as to move with the slide M.

Upon the plate-feeder M² are arranged guides m, adjusted to the width of the nail-plate.

Upon the feeder is arranged a cylinder, M³, upon a shaft, M⁴, the cylinder M³ being arranged in a spring-bearing, as seen in fig. 4, so as to press upon the plate, and so that, by the revolution of the cylinder, the plate may be forced inward, toward the cutters, and the cylinder is caused to revolve by the application of power to the shaft, as seen in fig. 1, or otherwise, it being arranged so that the cylinder, with the feed, may be moved transversely across the machine with the slide M, so as at the proper time to present the plate to each cutter.

The plate being inserted beneath the cylinder M³ is, by the revolution of the said cylinder, forced forward to the cutters; and when it is presented to the cutter K, the plate is forced under the cutter, until arrested by a proper stop, and there remains stationary, until the descending cutter K has cut from the plate the requisite quantity of metal; then, through the action of the crank N, the plate is moved across to the other cutter K', the plate fed in and cut by the cutter K', then returned to the other cutter, and so continued.

After the blank has been cut from the nail-plate, it is necessary to transfer it to the heading-die. This is done as seen in figs. 4 and 5.

Beneath each of the cutters is arranged a vertical slide, A¹ and A², upon which is arranged a die, or holder, a, denoted in red, fig. 4, and upon the said die a spring-catch, d.

The slide A¹, which carries the said die, or holder, is operated by a cam on the driving-shaft E, through a lever A², so as to raise the said die, as from the position in fig. 4 to that in fig. 5.

It is raised to the position in fig. 5 immediately before the descending of the cutter, and so that the said die, or holder a acts as a stop for the plate, to arrest the plate when it has been fed under the cutter, to cause the requisite quantity of metal to be cut from the plate.

Upon the descent of the cutter, as seen in fig. 5, the bevelled edge of the cutter strikes the head of the spring-catch d, and forces it back, as denoted in fig. 5; but as the cutter ascends, the catch returns over the blank which has been cut, and thus grasps the blank. Then the blank is carried down by the return of the slide A' to the position denoted in fig. 4, while the heading is being performed; and upon the descent of the blank the holding-dies $f$ and $g$, seen closed in fig. 4, and operated by the cams on the driving-shaft, are opened, as denoted in red, fig. 5, and so soon as the blank has been carried down the said dies $g$ close upon the blank, and carry it forward to the position in fig. 4, which is in position to be headed.

The operation of the heading-die is shown in fig. 6, the two dies $g$ $g$ grasping the blank.

The heading-die $h$ is arranged in the slide P, operated by the cam $P^1$ on the driving-shaft, through levers $P^2$, and when the blank is presented by the dies $g$ $g$, as seen in figs. 4 and 6, then the heading-die $h$ is forced forward, and heads the blank. The die is then opened to discharge the nail. The operation is continued, and nails successively cut and headed, the nail-holder and heading-dies upon each side of the machine operating relatively to their respective cutters.

The nail for which this machine is specially adapted is that patented as aforesaid, and as seen in Figure 7; but it will be readily seen by those skilled in this class of manufacture that the machine is equally adapted to the making of other descriptions of nails or tacks, and that by the arrangement of the feed, presenting the same plate to alternate cutters, the production of the machine is doubled, because the cutters and heading-dies may each operate equally as fast as in common nail-machines; consequently the two combined must operate twice as fast, and, the action being alternate, very little, if any more power is required to drive the two combined than the common single machine.

The adjustment of the parts for a different size or class of nails is of such a nature that any person skilled in the construction of similar machines will readily understand.

Having thus fully described our invention,

What we claim as new and useful, and desire to secure by Letters Patent, is:—

1. In combination with the revolving cylinder $M^3$, movable cutters K and K', and fixed cutters L and L', constructed and arranged to operate in the manner described, the transferring-die $a$, with its spring-catch $d$, as and for the purpose specified.

2. The combination of the movable cutter K, fixed cutter L, transferring-die $a$, with its spring-catch $d$, and the holding-dies $f$ and $g$, constructed and arranged so as to operate in the manner described.

3. In combination with the subject-matter of the second clause of claim, the heading-dies, operating as set forth.

S. K. JONES.
G. H. SNOW.

Witnesses:
J. H. SHUMWAY,
A. J. TIBBITS.